(12) United States Patent
Pfaff

(10) Patent No.: US 7,325,659 B2
(45) Date of Patent: Feb. 5, 2008

(54) DRUM BRAKE

(76) Inventor: Raymond Pfaff, 2730 N. 5th St., Carter Lake, IA (US) 51510

( * ) Notice: Subject to any disclaimer, the term of this patent is extended or adjusted under 35 U.S.C. 154(b) by 0 days.

(21) Appl. No.: 11/346,491

(22) Filed: Feb. 2, 2006

(65) Prior Publication Data

US 2006/0225970 A1    Oct. 12, 2006

Related U.S. Application Data

(60) Provisional application No. 60/669,204, filed on Apr. 7, 2005.

(51) Int. Cl.
*F16D 65/00* (2006.01)
(52) U.S. Cl. .............................. 188/218 R; 188/264 R
(58) Field of Classification Search ............ 188/218 R, 188/264 R, 78, 325, 329; 192/113.36
See application file for complete search history.

(56) References Cited

U.S. PATENT DOCUMENTS

| | | | | |
|---|---|---|---|---|
| 1,680,986 A | * | 8/1928 | Harelik | 188/79.55 |
| 1,974,905 A | * | 9/1934 | Walker | 188/218 R |
| 2,702,613 A | * | 2/1955 | Walther, Sr. | 188/218 R |
| 3,007,553 A | * | 11/1961 | Sinclair et al. | 188/218 R |
| 3,161,260 A | * | 12/1964 | Celestino | 188/78 |
| 4,287,978 A | * | 9/1981 | Staub, Jr. | 192/113.36 |

* cited by examiner

*Primary Examiner*—Robert A. Siconolfi
*Assistant Examiner*—Vu Q. Nguyen
(74) *Attorney, Agent, or Firm*—Adam H. Jacobs

(57) ABSTRACT

An improved drum brake includes a drum having an outer generally cylindrical circumferential wall having an inner braking surface and a side wall plate mounted on and extending between the inner side of the outer circumferential wall. A braking mechanism mounted within the drum includes at least one brake shoe having an arcuate brake pad mounted thereon and brake actuating means operative to force the arcuate brake pad into frictional contact with the inner braking surface. At least two diagonal grooves are formed in the inner braking surface of the outer circumferential wall, each of the at least two diagonal grooves having a generally V-shaped or U-shaped cross-sectional shape and extending substantially across the entire width of the outer circumferential wall to remove liquid from within the drum being forced rearwards and outwards out of the drum within the diagonal grooves due to the rotation of the drum.

11 Claims, 4 Drawing Sheets

DRUM BRAKE

CROSS-REFERENCE TO RELATED PROVISIONAL PATENT

This application claims priority based on a provisional patent, specifically on the Provisional Patent Application Ser. No. 60/669,204 filed Apr. 7, 2005.

BACKGROUND OF THE INVENTION

1. Technical Field

The present invention is directed to improved drum brakes and, more particularly, to an improved drum brake having a drum, at least one brake pad for engaging the internal surface of the drum, an actuating device for forcing the brake pad into contact with the drum, the drum including at least two diagonal grooves formed in the braking wall of the drum, each of the diagonal grooves extending from generally adjacent the inner side of the braking wall outwards towards the outer edge of the braking wall in the direction opposite the rotation of the drum such that water and other liquids which end up within the drum are directed into the grooves and channeled outwards to exit the interior of the drum, thus generally preventing the retention of liquids within the drum.

2. Description of the Prior Art

There are two major types of brakes which are used on vehicles, the disc brake and the drum brake. Of the two, the drum brake has been used for far longer and is still used today due to its reliability, longevity, and the fact that it is less expensive than an equivalent disc brake. In fact, continued technological development of drum brakes has made drum brakes almost as effective as disc brakes in many situations, and drum brakes are particularly well-suited for use with tractor trailers and the like, due to the ability of the drum brake to dissipate excessive heat built up as a result of the stopping of such large, heavy vehicles.

Briefly, a drum brake generally includes a drum having a cylindrical outer wall which surrounds a pair of brake shoes controlled by a brake cylinder which force the brake shoes outwards to contact the inner or braking wall of the drum, thus slowing and eventually stopping the rotation of the drum due to the frictional contact between the brake shoes and the braking wall of the drum. Because of the heat generated by friction between the brake shoes and the drum, it is neither desirable nor possible to completely enclose the drum brake to prevent foreign objects from entering the drum, and thus it is quite common, especially during periods of precipitation, for foreign materials such as water, mud, or other solid materials such as sand and road salt, to enter the drum and be retained therein due to the centrifugal force caused by rotation of the drum on the axle. Of course, the entry and retention of any foreign objects within the drum brake can affect performance of the drum brake, but a particular problem exists with the entry of water into the interior of the drum brake, as it occurs quite often and furthermore because the properties of water cause the water to form a thin layer on the braking wall of the drum due to the centrifugal force applied thereto. When water is present within the drum, activation of the brake shoes to engage the braking wall of the drum does not provide nearly the amount of stopping power available when the interior of the drum is dry. This is because the brake shoes first engage the thin layer of water which resides on the surface of the braking wall, and as water is not compressible, the brake shoe cannot directly contact the braking wall of the drum and thus a condition known as "hydroplaning" occurs, as shown in FIG. 2. In fact, until sufficient heat is built up through friction to evaporate the water from the interior of the drum, this condition continues and therefore the stopping distance required to stop the drum brake-equipped trailer is greatly increased, sometimes even doubled. There is therefore a need for a device or apparatus which will generally prevent this dangerous hydroplaning condition within the drum brake yet will not significantly increase the cost or complexity of the drum brake or significantly reduce the reliability of the drum brake.

Therefore, an object of the present invention is to provide an improved drum brake which will reduce hydroplaning within the brake.

Another object of the present invention is to provide an improved drum brake which includes an outer circumferential wall, a braking mechanism mounted within the outer circumferential wall of the drum brake which includes pads which contact the inner braking surface of the outer circumferential wall, the inner braking surface further including two or more diagonal grooves having generally V-shaped or U-shaped cross-sectional shapes, the diagonal grooves extending across the entire width of the outer circumferential wall.

Another object of the present invention is to provide an improved drum brake in which the diagonal grooves include top beveled edges which will not bind against the brake pad during the braking process.

Another object of the present invention is to provide an improved drum brake in which the diagonal grooves act to channel water away from the interior of the drum brake and release the water into the area external of the drum brake in order to ensure that brake pad to braking wall contact is generally free of hydroplaning.

Another object of the present invention is to provide an improved drum brake in which the diagonal grooves are shallow at the inner ends thereof and progressively get deeper as they extend to the outer edge of the drum brake to further assist in the channeling of water away from the braking surface of the outer circumference wall while also preventing brake freeze, a common condition encountered with drum brakes which have been sitting in cold temperatures for an extended period of time wherein the brake pads become frozen in a pool of water, thus preventing rotation of the vehicle's wheel.

Finally, an object of the present invention is to provide an improved drum brake which is relatively simple and durable in manufacture and is safe, effective, and efficient in use.

SUMMARY OF THE INVENTION

The present invention provides an improved drum brake including a drum having an outer generally cylindrical circumferential wall having an inner braking surface and a side wall plate mounted on and extending between the inner side of the outer circumferential wall. A braking mechanism mounted within the drum includes at least one brake shoe having an arcuate brake pad mounted thereon having a curvature approximately similar to the curvature of the inner braking surface of the outer circumferential wall and brake actuating means operative to force the arcuate brake pad into frictional contact with the inner braking surface of outer circumferential wall. At least two diagonal grooves are formed in the inner braking surface of the outer circumferential wall, each of the at least two diagonal grooves having a generally V-shaped or U-shaped cross-sectional shape and extending substantially across the entire width of the outer circumferential wall, the diagonal grooves operative to remove liquid within the drum which falls into the diagonal grooves as the liquid is forced rearwards and outwards out of the drum within the diagonal grooves due to the rotation of the drum.

As thus described, the improved drum brake of the present invention provides numerous advantages over those drum brakes found in the prior art. For example, the diagonal grooves in the inner braking surface of the drum serve to channel water away from the interior of the drum brake, thus generally eliminating hydroplaning between the drum brake pad and inner braking surface of the outer circumferential wall. In wet conditions, this will significantly decrease the stopping distance necessary to bring the vehicle equipped with the present invention to a halt, thus greatly increasing safety and likely reducing the number of accidents. Furthermore, because the diagonal grooves are preferably shallow at the inner ends thereof and progressively deeper as the groove moves towards the outer edge of the outer circumferential wall, water within the drum brake is channeled out of the drum brake, thus eliminating brake freeze, a common condition encountered with drum brakes which have been sitting in cold temperatures for an extended period of time wherein the brake pads become frozen in a pool of water, thus preventing rotation of the vehicle's wheel. Finally, because the present invention may be used in connection with already existing drum brakes, merely by replacing the old drum with the new drum including the diagonal grooves, it is a relatively simple and quick matter to retrofit already manufactured drum brakes with the improved drum of the present invention. The improved drum brake of the present invention thus provides a substantial improvement over those drum brakes found in the prior art.

DESCRIPTION OF THE PREFERRED EMBODIMENT

Figure 1:
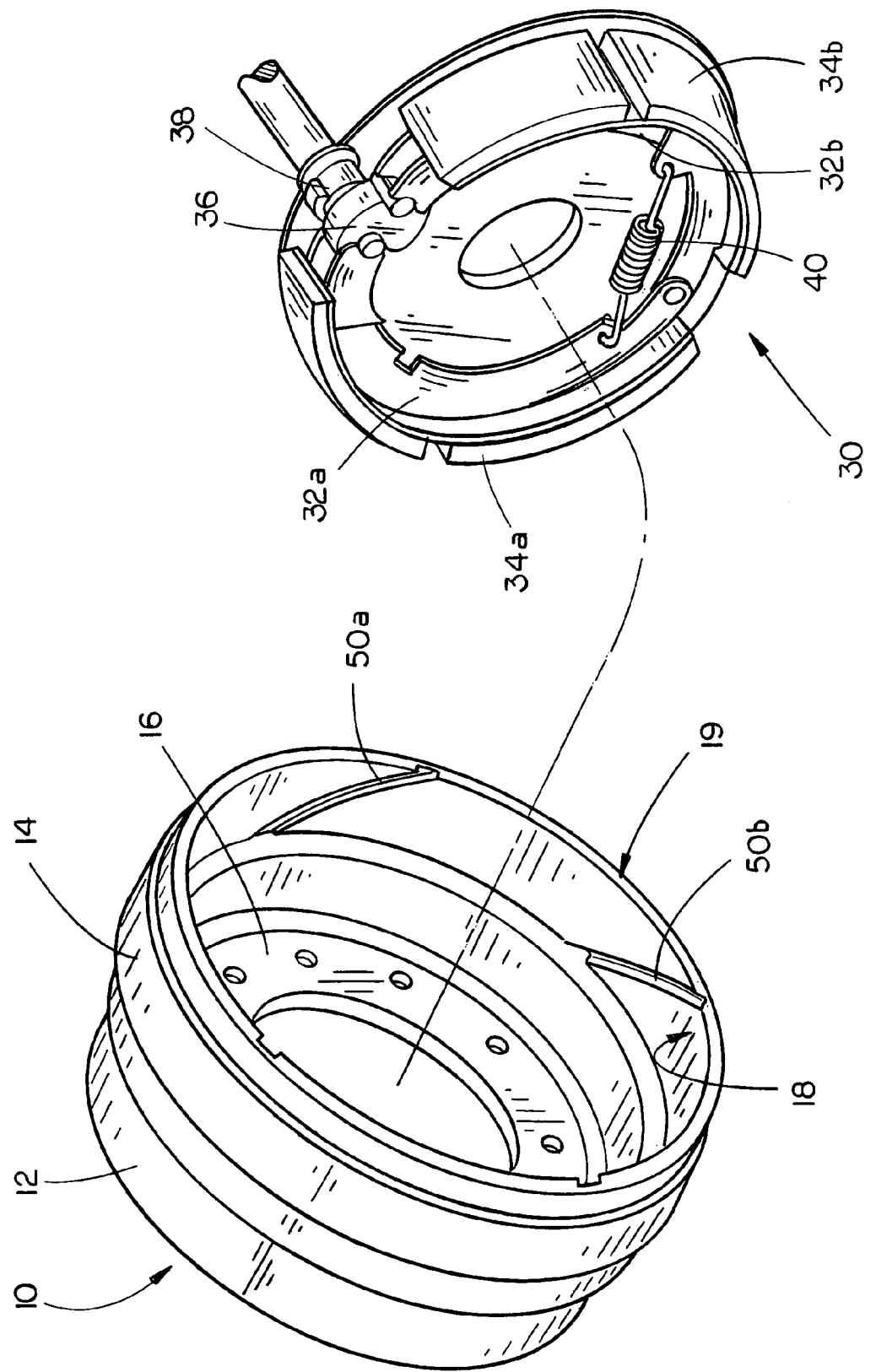
FIG. 1 is a perspective view of the improved drum brake of the present invention showing the grooves cut into the braking wall of the drum.
Figure 3:
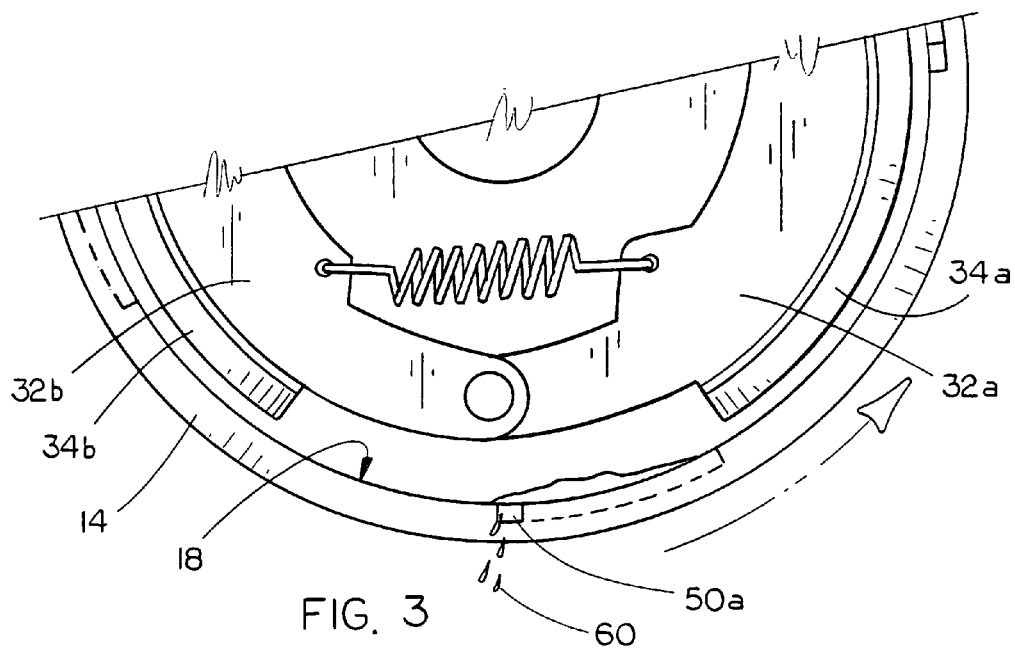
FIG. 3 is a detailed side elevational view showing water held within the drum being forced into the groove and exiting from the drum to generally prevent hydroplaning of the brake pad against the drum.
Figure 4:
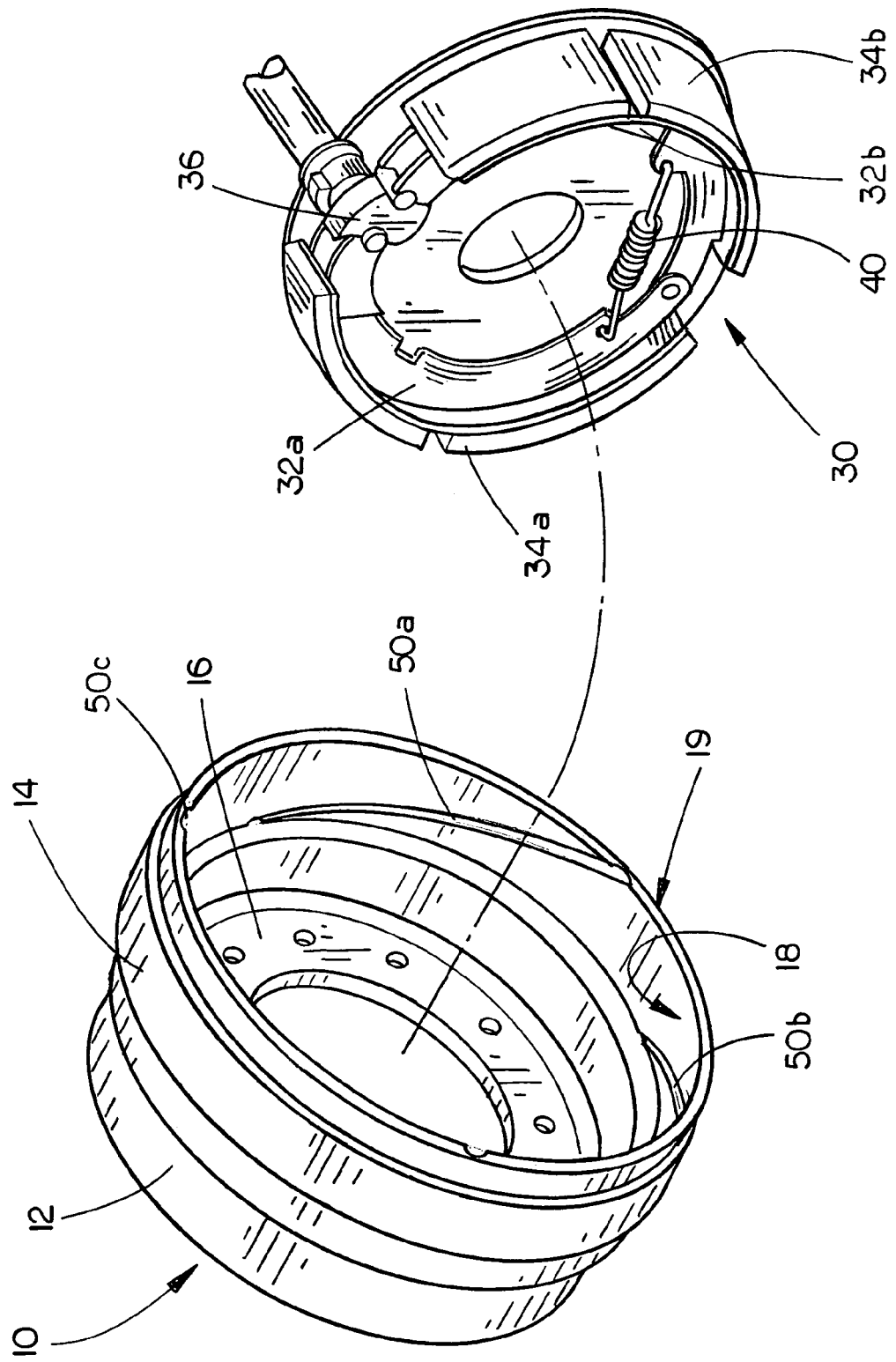
FIG. 4 is a perspective view of an alternative embodiment of the present invention showing the grooves extending at their preferred operating angles and including base walls which gradually widen and deepen as the groove approaches the outer edge.
Figure 5:
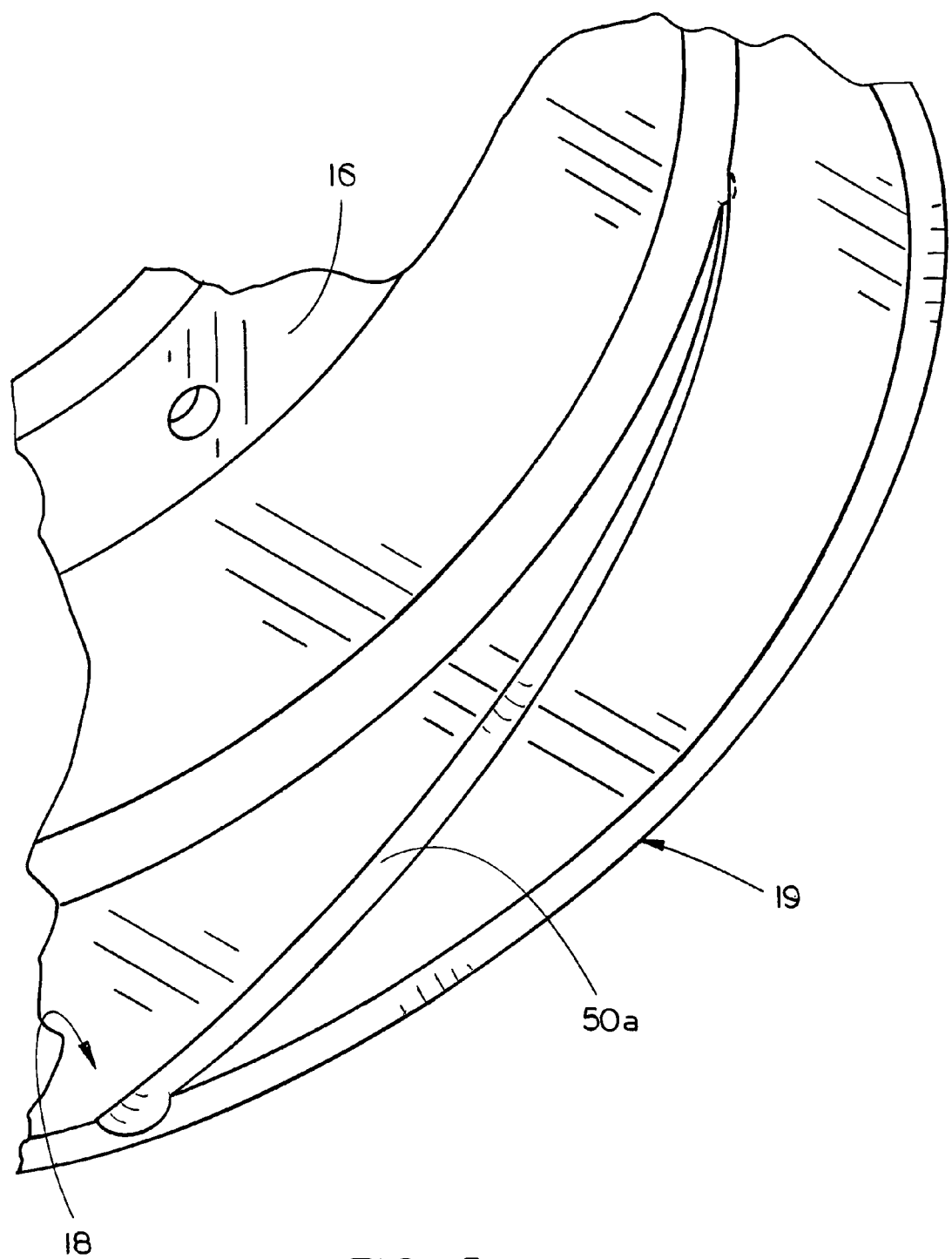
FIG. 5 is a detailed perspective view of the embodiment of FIG. 4 showing the widening and deepening of one of the grooves as formed in the wall of the drum brake.

The improved drum brake 10 of the present invention is shown best in FIGS. 1 and 3 as including a drum 12 having an outer circumferential wall 14 and a side wall plate 16 which encloses and strengthens the inner side of outer circumferential wall 14. In the preferred embodiment, the drum 12 would be constructed of a cast steel of the kind generally produced in connection with drum brakes currently available, with the thickness of outer circumferential wall 14 being approximately one inch in order to provide sufficient strength to outer circumferential wall 14. Of course, it may be necessary to increase the thickness of outer circumferential wall 14 or to construct the drum 12 out of a metal material having a higher tensile strength than that ordinarily used in connection with drum brakes should experimentation with the present invention prove such a modification necessary, and such modifications in construction materials and size, shape, and thickness of the drum 12 and, in particular, outer circumferential wall 14 should be understood to be part of this invention.

Mounted within drum 12 is the braking mechanism 30 which, in the preferred embodiment, would be generally similar to that used in connection with drum brakes currently being produced, including a pair of brake shoes 32a and 32b having arcuate brake pads 34a and 34b mounted on brake shoes 32a and 32b, each of the arcuate brake pads 34a and 34b having a curvature approximately similar to the curvature of inner braking surface 18 of outer circumferential wall 14, as shown best in FIG. 1. A brake cylinder 36 is operatively connected to the brake shoes 32a and 32b to force the arcuate brake pads 34a and 34b into frictional contact with the inner braking surface 18 of outer circumferential wall 14. Additional features of the braking mechanism 30 would include an adjuster mechanism 38 and one or more springs 40 which retract the brake shoes 32a and 32b and thus arcuate brake pads 34a and 34b from contact with the inner braking surface 18 of outer circumferential wall 14 when the brake cylinder 36 is not engaged. The brake cylinder 36 may be of any appropriate type, including pneumatic, hydraulic, or other such type, and, in general, the braking mechanism 30 would function in a manner similar to standard drum brakes which have been used in the industry for a long period of time.

The significant inventive feature of the present invention, however, will now be described. Formed on the inner braking surface 18 of drum 12 are preferably two or more diagonal grooves 50a and 50b having a generally V-shaped cross-sectional shape which extend across the entire width of outer circumferential wall 14 and would have a width at the top of approximately one quarter to one-half of an inch and a depth of approximately one quarter to one-half of an inch. As shown best in FIGS. 1 and 3, the grooves 50a and 50b are generally identical to one another, and therefore the description of groove 50a should be understood to apply equally to groove 50b and to any other grooves which would be formed in the inner braking surface 18 of outer circumferential wall 14. Groove 50a would extend from the inner side of inner braking surface 18 near side wall plate 16 of drum 12 outwards towards outer side 19 of inner braking surface 18 such that the groove 50a extends through outer side 19, thus permitting groove 50a to communicate with the area external of outer circumferential wall 14. As shown best in FIGS. 1 and 3, groove 50a would extend generally diagonally on inner braking surface 18 and have a generally V-shaped cross-sectional shape in order to minimize the possibility of the arcuate brake pads 34a and 34b accidentally engaging the groove 50a when the brake pads 34a and 34b are pressed into contact with the inner braking surface 18 of outer circumferential wall 14. Furthermore, it should be noted that the drum 12 shown in FIGS. 1 and 3 is for the left wheel brake and therefore the side wall plate 16 is on the right hand side of the drum 12 when the improved drum brake 10 of the present invention is fitted on the vehicle.

Figure 2:
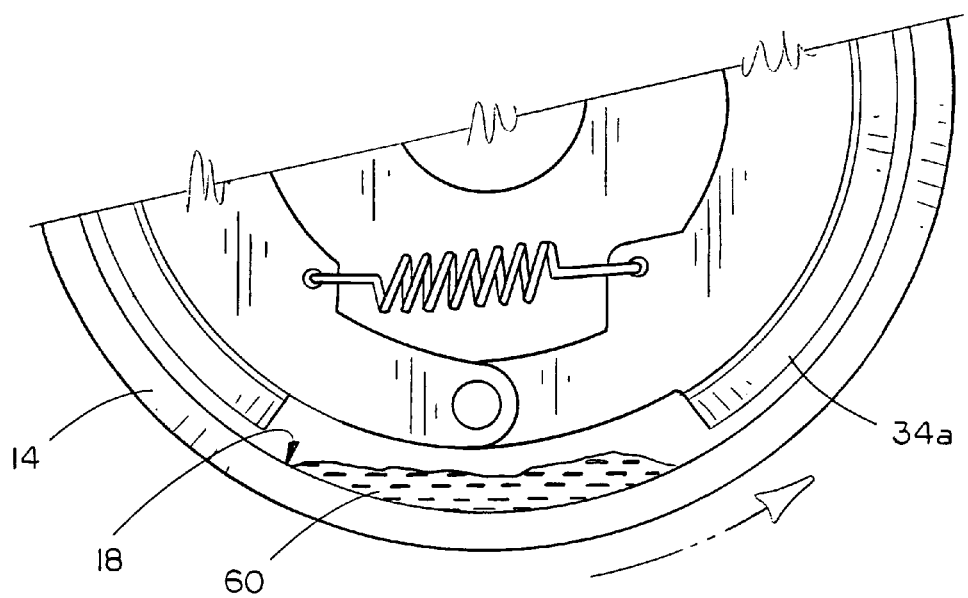
FIG. 2 is a detailed side elevational view of a drum found in the prior art showing water being retained within the drum.

The diagonal orientation of the groove 50a is thus clearly seen with the forward end of the groove 50a adjacent side wall plate 16 and the rearward end of groove 50a adjacent the outer side 19 of inner braking surface 18. With this diagonal orientation, water which falls into groove 50a is forced rearwards and outwards within groove 50a due to the rotation of the drum 12, the water being forced towards outer side 19 of inner braking surface 18 and outwards through the diagonal orientation of the groove 50a and the communication of groove 50a with outer side 19, as shown best in FIG. 3. Because of the centrifugal force being applied to water or other such liquids held within the drum 12, the liquid will attempt to find the lowest spot on outer circumferential wall 14, specifically on inner braking surface 18. Prior to the inclusion of the grooves 50a and 50b of the present invention, this meant that the water would spread itself evenly over the inner braking surface 18, as shown in FIG. 2, thus causing the hydroplaning effect described previously. With the inclusion of grooves 50a and 50b, the water 60 is forced into the grooves 50a and 50b during rotation of the drum 12 and, due to the forces involved during rotation of the drum 12, the water 60 is forced towards outer side 19 of inner braking surface 18 within the grooves 50a and 50b, as shown in FIG. 3. As the water 50 reaches outer side 19 within the grooves 50a and 50b, it is released from the drum 12 due to the communication of grooves 50a and 50b with the outer side 19 of inner braking surface 18, and therefore liquids held within the drum 12 are quickly and efficiently removed from the inner braking surface 18 of drum 12. This keeps the vast majority of the surface area of inner braking surface 18 dry, thus rendering the improved drum brake 10 of the present invention far more effective in providing stopping power than those drum brakes found in the prior art even during periods of precipitation.

It should be noted that the precise angle at which the grooves 50a and 50b extend relative to the rotational axis of drum 12 is not believed to be critical so long as some degree of diagonal orientation is provided to the grooves 50a and 50b. Further experimentation will likely determine the specific angle which works most effectively, but it is expected that an angle of between twenty degrees and seventy degrees (20° and 70°) will permit the grooves 50a and 50b to function effectively. Furthermore, with certain types of drums 12, it may be important to include a greater number of grooves in the inner braking surface 18 in order to quickly and efficiently remove liquids from the interior of the drum 12. Also, it is expected that the inclusion of a slight outwardly increasing depth for the base of the grooves 50a and 50b will further facilitate the removal of liquids from the interior of the drum 12. For example, the depth of groove 50a might be approximately one-half inch adjacent side wall plate 16 and have a depth of approximately five-eighths inch adjacent outer side 19 of inner braking surface 18, with the change in depth being uniform between the side wall plate 16 and outer side 19 of outer circumferential wall 14. As liquids flow downhill, so it is expected that inclusion of a depth change such as that described above will facilitate removal of liquids from the interior of the drum 12, although such a modification is not necessary for the grooves 50a and 50b of the present invention to perform their intended function.

It is to be understood that numerous additions, modifications, and substitutions may be made to the improved drum brake 10 of the present invention which fall within the intended broad scope of the above description. For example, the size, shape, number, and orientation of the grooves 50a and 50b may be modified or changed so long as the grooves perform their intended function of channeling water away from the inner braking surface 18 of outer circumferential wall 14 of drum 12 into the grooves and out of the drum 12 past outer side 19 of inner braking surface 18. Also, the exact cross-sectional shape of the grooves 50a and 50b may be modified or changed so long as the intersection of inner braking surface 18 and the grooves 50a and 50b is generally beveled to prevent unintentional binding or impact with the arcuate brake pads 34a and 34b as the braking mechanism 30 engages the drum 12 to slow and stop the improved drum brake 10 of the present invention. Finally, it should be noted that, although the present invention has been described as including grooves 50a and 50b on inner braking surface 18 of outer circumferential wall 14 of the drum 12, it may be desirable and even preferable to include a plurality of diagonal grooves formed on the arcuate brake pads 34a and 34b of braking mechanism 30 which would generally perform the same function as the grooves 50a and 50b formed in the inner braking surface 18. In fact, it may be preferable to include such grooves on both the arcuate brake pads 34a and 34b and the inner braking surface 18 of outer circumferential wall 14 in order to substantially eliminate the possibility of hydroplaning within the improved drum brake 10.

There has therefore been shown and described an improved drum brake 10 which accomplishes at least all of its intended objectives.

I claim:

1. An improved drum brake comprising:
    a drum having an outer generally cylindrical circumferential wall having inner and outer sides and an inner braking surface and a side wall plate mounted on and extending between the inner side of said outer circumferential wall;
    a braking mechanism including at least one brake shoe having an arcuate brake pad mounted thereon and brake actuating means operative to force the arcuate brake pad into frictional contact with the inner braking surface of outer circumferential wall; and
    at least two diagonal grooves formed in said inner braking surface of said outer circumferential wall, each of said at least two diagonal grooves having a base and a generally V-shaped or U-shaped cross-sectional shape and extending substantially across the entire width of said outer circumferential wall, each of said at least two diagonal grooves extend at an angle relative to the rotational axis of said drum, said angle being between fifty degrees and seventy degrees (50° and 70°), said at least two diagonal grooves each further include slight outwardly increasing depth for the base of said at least two diagonal grooves relative to said inner braking surface with the change in depth being generally uniform between said side wall plate and said outer side of said outer circumferential wall, said at least two diagonal grooves operative to transfer liquid from within said drum which falls into said at least two diagonal grooves out of said drum as the liquid is forced rearwards and outwards out of said drum within said at least two diagonal grooves due to the rotation of the drum.

2. The improved drum brake of claim 1 wherein said at least two diagonal grooves are generally equidistantly spaced from adjacent ones of said at least two diagonal grooves around the inner braking surface of said outer circumferential wall.

3. The improved drum brake of claim 1 wherein said at least two diagonal grooves have a forward end of each of said at least two diagonal grooves adjacent said side wall plate and a rearward end of each of said at least two diagonal grooves adjacent the outer side of said inner braking surface.

4. The improved drum brake of claim 1 wherein said braking mechanism further includes that each of said arcuate brake pads have a curvature approximately similar to the curvature of inner braking surface of outer circumferential wall, and said brake actuating means further comprises a brake cylinder, an adjuster mechanism for adjusting the positioning of said arcuate brake pads and at least one spring operative to retract said arcuate brake shoe and thus said arcuate brake pads from contact with said inner braking surface of said outer circumferential wall when said brake cylinder is not engaged.

5. The improved drum brake of claim 1 wherein said at least two diagonal grooves are formed in said outer circumferential wall during casting of said drum.

6. The improved drum brake of claim 1 wherein said at least two diagonal grooves are formed in said outer circumferential wall by grinding said at least two diagonal grooves in said inner braking surface of said drum.

7. A improved drum brake for use with a braking mechanism including at least one brake shoe having an arcuate brake pad and a brake actuating mechanism, said improved drum brake comprising:
   a drum having an outer generally cylindrical circumferential wall having inner and outer sides and an inner braking surface and a side wall plate mounted on and extending between the inner side of said outer circumferential wall;
   the braking mechanism housed within said drum; and
   at least two diagonal grooves formed in said inner braking surface of said outer circumferential wall, each of said at least two diagonal grooves having a base and a generally V-shaped or U-shaped cross-sectional shape and extending substantially across the entire width of said outer circumferential wall, each of said at least two diagonal grooves extend at an angle relative to the rotational axis of said drum, said angle being between fifty degrees and seventy degrees (50° and 70°), said at least two diagonal grooves each further include slight outwardly increasing depth for the base of said at least two diagonal grooves relative to said inner braking surface with the change in depth being generally uniform between said side wall plate and said outer side of said outer circumferential wall, said at least two diagonal grooves operative to transfer liquid from within said drum which falls into said at least two diagonal grooves out of said drum as the liquid is forced rearwards and outwards out of said drum within said at least two diagonal grooves due to the rotation of the drum.

8. The improved drum brake of claim 7 wherein said at least two diagonal grooves are generally equidistantly spaced from adjacent ones of said at least two diagonal grooves around the inner braking surface of said outer circumferential wall.

9. The improved drum brake of claim 7 wherein said at least two diagonal grooves have a forward end of each of said at least two diagonal grooves adjacent said side wall plate and a rearward end of each of said at least two diagonal grooves adjacent the outer side of said inner braking surface.

10. The improved drum brake of claim 7 wherein said at least two diagonal grooves are formed in said outer circumferential wall during casting of said drum.

11. The improved drum brake of claim 7 wherein said at least two diagonal grooves are formed in said outer circumferential wall by grinding said at least two diagonal grooves in said inner braking surface of said drum.

\* \* \* \* \*